United States Patent
Bermejo Fernandez et al.

(10) Patent No.: US 11,252,323 B2
(45) Date of Patent: Feb. 15, 2022

(54) FACILITATION OF VISUAL TRACKING

(71) Applicant: The Hong Kong University of Science and Technology, Hong Kong (CN)

(72) Inventors: Carlos Bermejo Fernandez, Hong Kong (CN); Pan Hui, Hong Kong (CN)

(73) Assignee: The Hong Kong University of Science And Technology, Kowloon (HK)

( * ) Notice: Subject to any disclaimer, the term of this patent is extended or adjusted under 35 U.S.C. 154(b) by 0 days.

(21) Appl. No.: 16/760,422

(22) PCT Filed: Oct. 31, 2017

(86) PCT No.: PCT/US2017/059373
§ 371 (c)(1),
(2) Date: Apr. 29, 2020

(87) PCT Pub. No.: WO2019/089014
PCT Pub. Date: May 9, 2019

(65) Prior Publication Data
US 2020/0344409 A1    Oct. 29, 2020

(51) Int. Cl.
*H04N 5/232* (2006.01)
*H04N 5/247* (2006.01)
*H04N 7/18* (2006.01)

(52) U.S. Cl.
CPC ..... *H04N 5/23219* (2013.01); *H04N 5/23206* (2013.01); *H04N 5/247* (2013.01); *H04N 7/181* (2013.01)

(58) Field of Classification Search
CPC .......... H04N 5/23219; H04N 5/23206; H04N 5/247; H04N 7/181; G06K 9/00369; G06K 9/00771; G06K 9/6273
See application file for complete search history.

(56) References Cited

U.S. PATENT DOCUMENTS

| | | |
|---|---|---|
| 5,465,115 A | 11/1995 | Conrad et al. |
| 5,973,732 A | 10/1999 | Guthrie |
| 6,204,764 B1 | 3/2001 | Maloney |
| 7,742,623 B1 | 6/2010 | Moon et al. |
| 7,930,204 B1 | 4/2011 | Sharma et al. |
| 8,219,438 B1 | 7/2012 | Moon et al. |
| 9,158,975 B2 | 10/2015 | Lipton et al. |
| 2005/0078178 A1 | 4/2005 | Brown et al. |
| 2006/0187305 A1* | 8/2006 | Trivedi .............. G06K 9/00241 348/169 |
| 2007/0183651 A1 | 8/2007 | Comaniciu et al. |

(Continued)

OTHER PUBLICATIONS

International Search Report and Written Opinion for PCT Application No. PCT/US17/59373 dated Feb. 1, 2018, 10 pages.

(Continued)

*Primary Examiner* — Lin Ye
*Assistant Examiner* — John H Morehead, III
(74) *Attorney, Agent, or Firm* — Amin, Turocy & Watson, LLP (57) ABSTRACT

A visual tracker can be configured to obtain profile data associated with a pose of a living entity. In response to detecting a person, a camera can be selected from cameras. Additionally, in response to selecting the camera, the system can receive video data from the camera representative of a stance of the person. Consequently, the stance of the person can be estimated, resulting in an estimated stance.

20 Claims, 10 Drawing Sheets

(56) References Cited

U.S. PATENT DOCUMENTS

| | | | |
|---|---|---|---|
| 2008/0303902 A1 | 12/2008 | Romer et al. | |
| 2010/0201821 A1* | 8/2010 | Niem | G08B 21/06 348/159 |
| 2010/0208078 A1 | 8/2010 | Tian et al. | |
| 2011/0157431 A1* | 6/2011 | Ivanov | G08B 13/19645 348/240.99 |
| 2011/0228051 A1 | 9/2011 | Dedeoglu et al. | |
| 2011/0263946 A1* | 10/2011 | el Kaliouby | G06K 9/00335 600/300 |
| 2014/0192259 A1* | 7/2014 | Holz | G06F 3/0425 348/372 |
| 2015/0199025 A1* | 7/2015 | Holz | G06F 3/043 345/156 |
| 2016/0092736 A1* | 3/2016 | Mai | G06K 9/4604 382/103 |
| 2016/0321506 A1* | 11/2016 | Fridental | G06K 9/00335 |
| 2016/0360970 A1* | 12/2016 | Tzvieli | A61B 5/6803 |
| 2017/0006215 A1* | 1/2017 | Leung | G08B 13/19641 |
| 2017/0091561 A1* | 3/2017 | Pham | G06K 9/34 |
| 2017/0177946 A1* | 6/2017 | Citerin | G06K 9/4671 |
| 2017/0178345 A1* | 6/2017 | Pham | G06T 7/277 |

OTHER PUBLICATIONS

Greenstein et al., "Improving wireless privacy with an identifier-free link layer protocol,", in Proceedings of the 6th International conference on Mobile systems, applications, and services. ACM, 2008, pp. 40-53.

Sherry et al., "Blindbox: Deep packet inspection over encrypted traffic", In ACM SIGCOMM Computer Communication Review, vol. 45, No. 4. ACM, 2015, pp. 213-226.

Lopez-Alt et al., "On-the-fly multiparty computation on the cloud via multikey fully homomorphic encryption", In Proceedings of the forty-fourth annual ACM symposium on Theory of computing. ACM, 2012, pp. 1219-1234.

Naveed et al., "Inference attacks on property-preserving encrypted databases", In Proceedings of the 22nd ACM SIGSAC Conference on Computer and Communications Security. ACM, 2015, pp. 644-655.

Wang, F. Y.-F., "Cryptographically enforced access control for user data in untrusted clouds," Ph.D. dissertation, Massachusetts Institute of Technology, 2016. pp. 1-60.

Zou et al., "Very low resolution face recognition problem," IEEE Transactions on Image Processing, vol. 21, No. 1, , 2012, pp. 327-340.

Kanda et al., "Who will be the customer?: A social robot that anticipates people's behavior from their trajectories," In Proceedings of the 10th international conference on Ubiquitous computing. ACM, 2008, pp. 380-389.

Lee et al., "Understanding customer mailing behavior in an urban shopping mall using smartphones", In Proceedings of the 2013 ACM conference on Pervasive and ubiquitous computing adjunct publication. ACM, 2013, pp. 901-910.

Zhou et al., "Human recognition based on face profiles in video", In Computer Vision and Pattern Recognition-Workshops, 2005. CVPR Workshops. IEEE Computer Society Conference on. IEEE, 2005, pp. 1-8.

Kakadiaris et al., "Profile-based face recognition", In Automatic Face & Gesture Recognition, 2008. FG'08. 8th IEEE International Conference on. IEEE, 2008, pp. 1-8.

Toshev et al., "Deeppose: Human pose estimation via deep neural networks", In Proceedings of the IEEE Conference on Computer Vision and Pattern Recognition, 2014, pp. 1653-1660.

Insafutdinov et al.,"DeeperCut: A Deeper, Stronger, and Faster Multi-Person Pose Estimation Model", arXiv:1605 03170v3 [cs.CV] Nov. 30, 2016, Available: http://arxiv.org/abs/1605.03170, pp. 1-22.

Bhanu et al., "Face recognition from face profile using dynamic time warping", In Pattern Recognition, 2004. ICPR 2004. Proceedings of the 17th International Conference on, vol. 4. IEEE, 2004, pp. 499-502.

Mukai et al., "Profile recognition based on co-training", In SIGGRAPH Asia 2016 Posters. ACM, 2016, pp. 1.

Chawathe, S.S. , "Beacon placement for indoor localization using blue-tooth," in Intelligent Transportation Systems, 2008. ITSC 2008. 11th International IEEE Conference on. IEEE, 2008, pp. 980-985.

Wu et al., "Non-invasive detection of moving and stationary human with wifi", IEEE Journal on Selected Areas in Communications, vol. 33, No. 11, 2015, 13 pages.

Karbownik et al., "Evaluation of indoor real time localization systems on the uwb based system case", In 2015 International Conference on Indoor Positioning and Indoor Navigation (IPIN2015), Banff, Canada, 2015. pp. 1-2.

Long et al., ,"Research on network scalability based on uwb indoor localization system," in MATEC Web of Conferences, vol. 42. EDP Sciences, 2016, 5 pages.

Kriz et al., "Improving indoor localization using bluetooth low energy beacons", Mobile Information Systems, vol. 2016, 2016, 12 pages.

Zhuang et al., "Smartphone-based indoor localization with bluetooth low energy beacons," Sensors, vol. 16, No. 5, p. 596, 2016, pp. 1-20.

Huynh et al., "Vlc-based positioning system for an indoor environment using an image sensor and an accelerometer sensor", Sensors, vol. 16, No. 6, p. 783, 2016, pp. 1-16.

Rallapalli et al., "Enabling physical analytics in retail stores using smart glasses", In Proceedings of the 20th annual international conference on Mobile computing and networking. ACM, 2014, pp. 115-126.

Radhakrishnan et al., "IOT + small data: Transforming in-store shopping analytics & services," in Communication Systems and Networks (COMSNEIS), 2016 8th International Conference on. IEEE, 2016, pp. 1-6.

Leonard et al., "Simultaneous map building and localization for an autonomous mobile robot", In Intelligent Robots and Systems' 91.'Intelligence for Mechanical Systems, Proceedings IROS'91. IEEE/RSJ International Workshop on. Ieee, 1991, pp. 1442-1447.

Kerl et al., "Dense visual slam for rgb-d cameras", In Intelligent Robots and Systems (IROS), 2013 IEEE/RSJ International Conference on. IEEE, 2013, pp. 2100-2106.

Menon et al.,"Consumer attention to price in social commerce: Eye tracking patterns in retail clothing", Journal of Business Research, vol. 69, No. 11, 2016, pp. 5008-5013.

Zhang et al., "Appearance-based gaze estimation in the wild", In Proceedings of the IEEE Conference on Computer Vision and Pattern Recognition, 2015, pp. 4511-4520.

George et al.,"Real-time eye gaze direction classification using convolutional neural network", In Signal Processing and Communications (SPCOM), 2016 International Conference on. IEEE, 2016, pp. 1-5.

Xia et al., "Accurate gaze tracking from single camera using gabor corner detector," Multimedia Tools and Applications, vol. 75, No. 1, 2016, pp. 221-239.

Chinomi et al., "Prisurv: privacy protected video surveillance system using adaptive visual abstraction," Advances in Multimedia Modeling, 2008, pp. 144-154.

Raval et al.,"What you mark is what apps see" In Proceedings of the 14th Annual International Conference on Mobile Systems, Applications, and Services ACM, 2016, pp. 249-261.

Shu et al.,"Cardea: Context-aware visual privacy protection from pervasive cameras", arXiv preprint arXiv:1610.00889, Oct. 4, 2016, 10 pages.

\* cited by examiner

FACILITATION OF VISUAL TRACKING

CROSS-REFERENCE TO RELATED APPLICATION

This application is a U.S. National Stage patent application filing under 35 USC § 371 of international Patent Cooperation Treaty (PCT) Application No. PCT/US2017/059373, filed on Oct. 31, 2017, and entitled "FACILITATION OF VISUAL TRACKING" the entirety of which application is hereby incorporated by reference herein in its entirety.

TECHNICAL FIELD

This disclosure relates generally to facilitating visual tracking. More specifically, this disclosure relates to gaze estimation in relation to objects in the line of sight of a living entity.

BACKGROUND

Video tracking is the process of locating a moving object (or multiple objects) over time using a camera. It has a variety of uses, some of which are: human-computer interaction, security and surveillance, video communication and compression, augmented reality, traffic control, medical imaging and video editing.

The above-described background relating to a visual tracking is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate visual tracking by a living entity. For simplicity of explanation, the methods are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium or a machine-readable storage medium.

Described herein are systems, methods, articles of manufacture, and other embodiments or implementations that can facilitate visual tracking. Visual tracking can be implemented in connection with any type of device with a connection to the communications network such as: a video camera, a mobile handset, a computer, a handheld device, or the like.

Real-time tracking and shopper behavior analytics can be used to predict shoppers' purchasing habits while preserving shopper's privacy. A vision tracking system can utilize modern computer vision techniques such as convolutional neural networks (CNNs) to track shoppers around a store and estimate their profile (e.g., gaze and pose) without facial recognition techniques. The proposed system can estimate a shopper's gaze without face detection. The system can use multiple cameras with different view angles to select the best shopper gaze estimation.

The vision tracking system can estimate a shopper's gaze without face profile captured images and maintain visual privacy because it does not require facial recognition to estimate the shopper's gaze. Additionally, the system can utilize closed circuit television (CCTV) security cameras to capture images. Object recognition can improve the system by determining the object, which the shopper (e.g., living entity) has been determined to have been gazing.

The closer a shopper is to an object, the smaller the visual field of the shopper. Therefore, the shopper needs to move his/her head to view other nearby items. Based on this assumption, a gaze estimation model can be based on head movements and camera source selection. The camera's field of view can depend on individual shoppers' situations. For example, due to the placement of the cameras and the cameras' fields of view, the proposed system can evaluate the best angle and/or the best camera source to estimate the shopper's gaze. The model can be trained to recognize the best camera source. Additionally, a shoulder and head perspective (not face profile) can improve the accuracy of the system to estimate the gaze and comply with privacy conditions in relation to the user (i.e., no face recognition capabilities). Because the system assumes the shopper's gaze is limited when the items are very close, the shopper must move his/her head to locate other items nearby. The current system can estimate a shopper's gaze and pose while restricting identification of the shopper.

The visual tracking system can utilize CNNs constructed with deep learning frameworks (e.g., Tensorflow, Torch, Caffe, etc.) for both pose and gaze estimation. For example, Tensorflow can provide real-time performance for devices with limited resources, such as smartphones.

Gaze estimation can be defined as a pitch and/or yaw of a living entity's head. Assuming that the living entity's eyes do not move or move very little, the head will move to focus in on other nearby items, keeping the eyes in a straight direction. Therefore, both parameters, yaw and pitch, can be estimated to contribute to the gaze (eyes are fixed and the head moves). This scenario can be applied in retail stores where shoppers usually move towards items of interest.

After the visual tracker system tracks a living entity, it can select the best camera to estimate the pose and gaze to understand the shopper's behavior. The camera can be selected based on a distance from the shopper and/or the distance between the shopper and the object the shopper is viewing. Additionally, the system can select the camera source to estimate gaze and pose according to pre-defined criteria. The pre-defined criteria can be selected to achieve the optimal gaze estimation performance such as: shoulders, view, face visibility, distance, etc. After the camera source is selected, the system can continue with the gaze and pose estimation using various CNN models. The information regarding gaze (e.g., yaw and pitch) and pose can then be forwarded to a data analytics engine to study the shopper's behavior. Additionally, the information regarding gaze and pose can be sent to a workstation device for user analysis.

Monitoring a gaze and/or a pose of a shopper can improve understanding of shopper behavior. Additionally, tracked and collected information can provide retail stores with data for strategic product placement. For example, a retail store can track the shopper's movement, detect when the shopper has stopped, detect what the shopper is looking at, and how long the shopper is looking at an item (i.e., a bag, phone, etc.).

The visual tracking system can also be implemented with object recognition to know which shelf, or shop location the shopper is near. For example, if cereal and oatmeal are on aisle one and potato chips and pretzels are on aisle five, after the system selects a camera based on a shopper being near aisle one, the system can automatically prevent potato chips and pretzels from being listed as an object that the shopper could be viewing.

It should also be noted that an artificial intelligence (AI) component can facilitate automating one or more features in accordance with the disclosed aspects. A memory and a processor as well as other components can include functionality with regard to the figures. The disclosed aspects in connection with visual tracking situations can employ various AI-based schemes for carrying out various aspects thereof. For example, a process for detecting one or more trigger events, selecting a camera as a result of the one or more trigger events, and modifying one or more reported measurements, and so forth, can be facilitated with an example automatic classifier system and process. In another example, a process for penalizing one camera while preferring another camera can be facilitated with the example automatic classifier system and process.

An example classifier can be a function that maps an input attribute vector, $x=(x1, x2, x3, x4, xn)$, to a confidence that the input belongs to a class, that is, $f(x)$=confidence (class). Such classification can employ a probabilistic and/or statistical-based analysis (e.g., factoring into the analysis utilities and costs) to prognose or infer an action that can be automatically performed.

A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via a generic training data) as well as implicitly trained (e.g., via observing mobile device usage as it relates to triggering events, observing network frequency/technology, receiving extrinsic information, and so on). For example, SVMs can be configured via a learning or training phase within a classifier constructor and feature selection module. Thus, the classifier(s) can be used to automatically learn and perform a number of functions, including but not limited to selecting cameras, processing gaze data, generating an output, and so forth. The criteria can include, but is not limited to, predefined values, frequency attenuation tables or other parameters, service provider preferences and/or policies, and so on.

In one embodiment, described herein is a method comprising selecting, by a wireless network device comprising a processor, a camera from cameras in response to detecting a person. Additionally, in response to the selecting the camera, the method can comprise receiving, by the wireless network device, video data from the camera representative of a stance of the person. Furthermore, based on the video data, the method can estimate, by the wireless network device, the stance of the person, resulting in an estimated stance.

According to another embodiment, a system can facilitate, in response to detecting a motion, selecting a camera from cameras. In response to the selecting the camera, the system can receive video data from the camera, wherein the video data comprises position data representative of a stance of a person. Additionally, in response to the receiving the video data, the system can estimate the stance of the person, resulting in estimated stance data associated with an estimated stance from the estimating.

According to yet another embodiment, described herein is a computer-readable storage medium that can perform the operations comprising selecting a video feed associated with the camera based on a distance between a person and a camera. In response to the selecting the video feed associated with the camera, the computer-readable storage medium can receive video data representative of a video of the person, and based on the video data, the computer-readable storage medium can generate stance data representative of a stance of the person.

These and other embodiments or implementations are described in more detail below with reference to the drawings.

Figure 1:
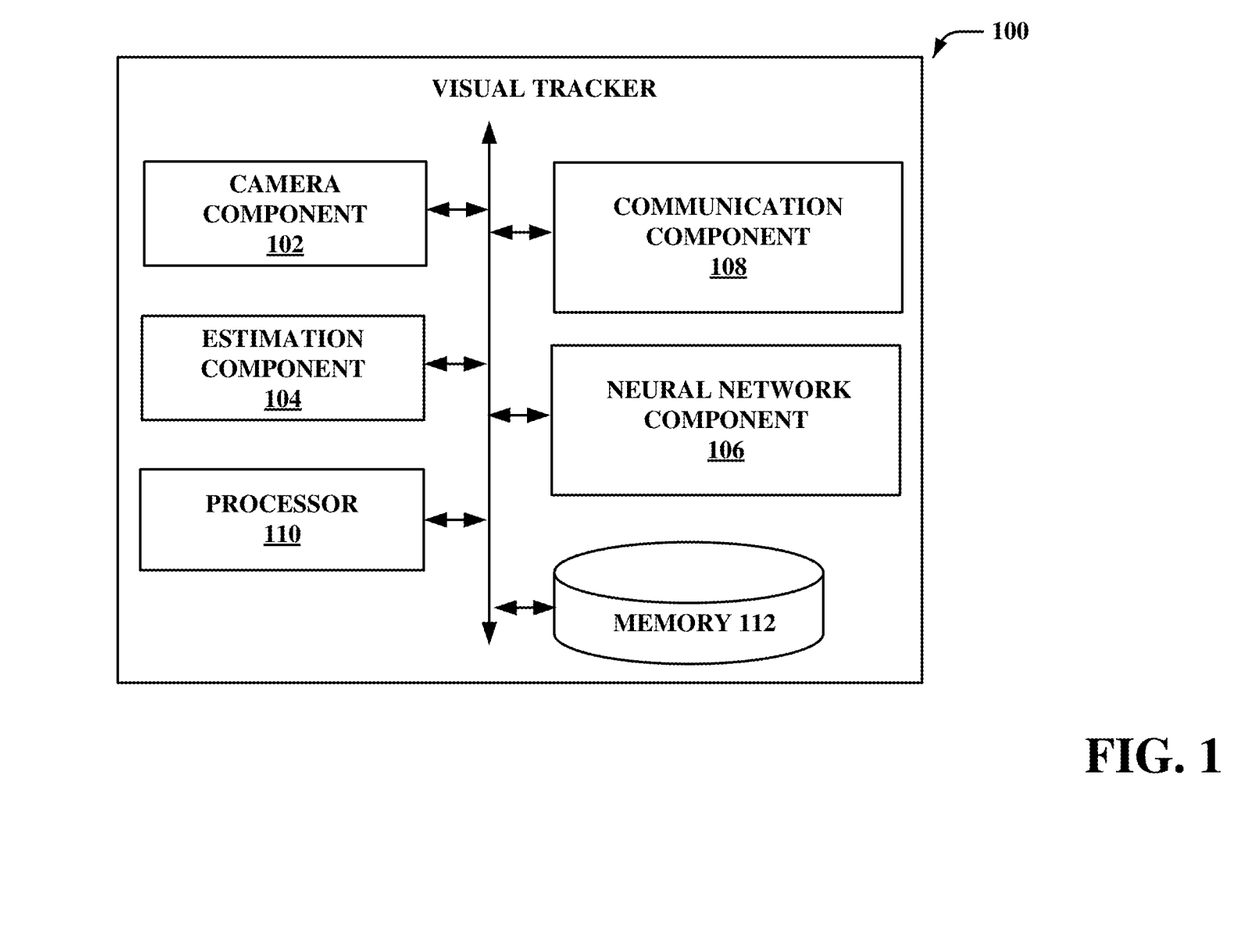
FIG. 1 illustrates an example visual tracker according to one or more embodiments.

Referring now to FIG. 1, illustrated is an example visual tracker according to one or more embodiments. The visual tracker 100 can comprise several subcomponents including, but not limited to: a camera component 102, an estimation component 104, a communication component 108, a neural network component 106, etc. The visual tracker can also comprise a processor 110 and a memory 112.

It should be noted that the sub-components, the processor 110, and the memory 112 can bi-directionally communicate with each other. Aspects of the processor 110 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. It should also be noted that in alternative embodiments other components including, but not limited to, the subcomponents, the processor 110, and/or the memory 112, can be external to the visual tracker.

Upon the visual tracker 100 receiving an indication that a living entity (e.g., animal, human, etc.) is within a range of the visual tracker, within a certain geographic location, and/or within the view of at least one camera, the visual tracker 100 camera component 102 can select a camera from a group of cameras to track a profile of the living entity. The camera can also be selected based on its field of view of the living entity and/or a field of view of a possible object that the living entity is viewing. For example if a shopper walks into a store, the camera component 102 can select the camera closest to the shopper that provides a clear line of sight to the shopper. The camera can acquire data associated with a position of the shopper's shoulders, a position of the shopper's head (e.g., pitch, yaw, etc.), a movement of the shopper's head, an orientation of the shopper's overall stance, etc.

Based on the data received by the camera, the estimation component 104 can estimate the shoppers gaze and/or pose without using facial recognition techniques. In essence, based on video data, the estimation component 104 can decipher how long a shopper has looked in a certain direction. The certain direction can correspond to a location (e.g., shelf, floor, display, etc.) indicating that the shopper has viewed a particular object at the location. The estimation component 104 can also leverage data from a neural network component 106. It should be noted that the neural network can be any type of neural network. For example, the neural network component 106 can leverage a convolutional neural network (CNN) to provide an analysis of the video data. The CNN can compare and contrast current poses and/or profiles of the shopper with previous posses and/or profiles of other shoppers. Certain probabilities can be ascertained based on how long previous shoppers have gazed at an object. For example, one statistic that can be generated via the visual tracker is that 80% of shoppers that gaze at a certain object for more than 10 seconds purchase that object. Therefore, a store can more accurately predict a shoppers behavior based on the shoppers body language.

Figure 2:
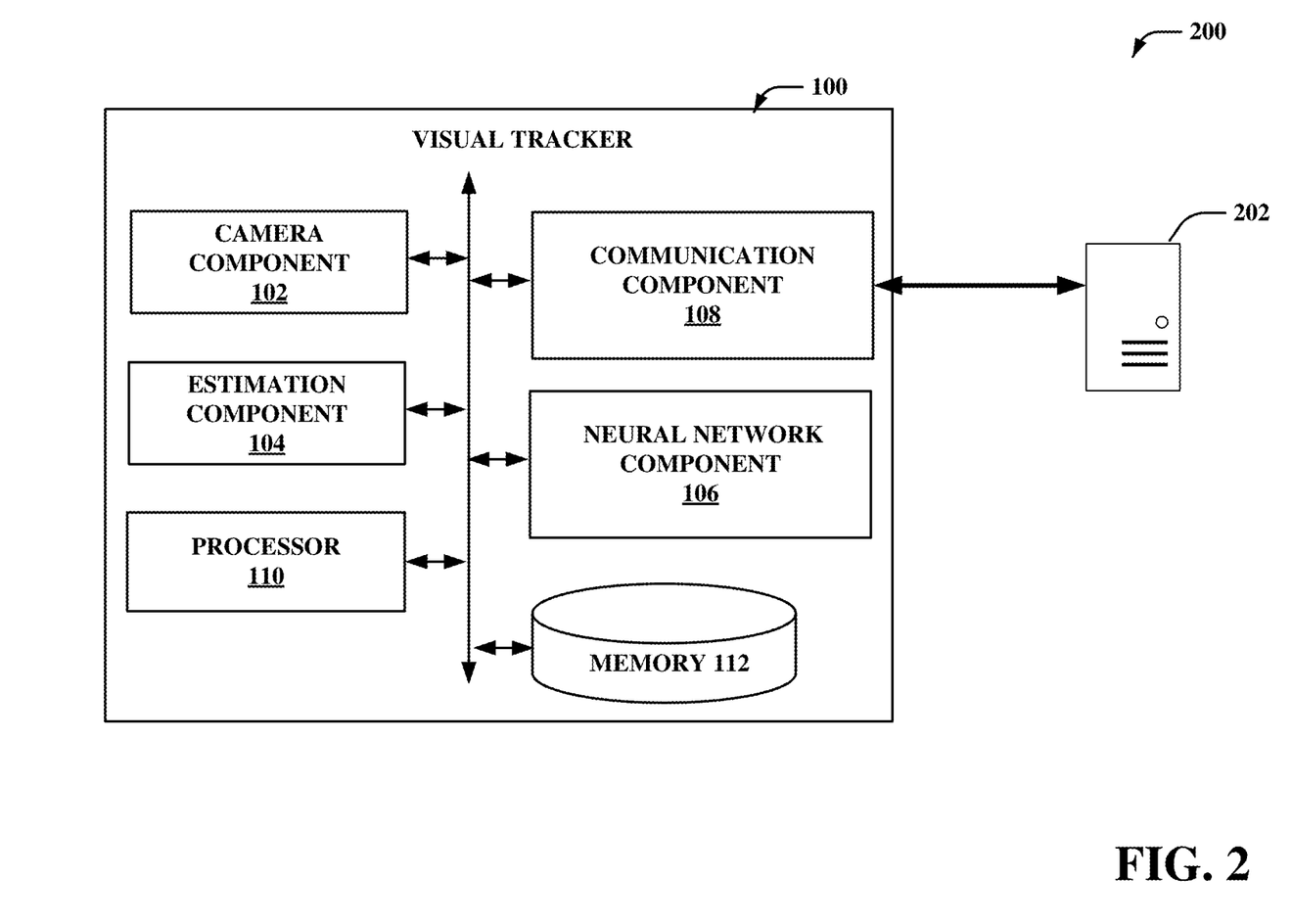
FIG. 2 illustrates an example visual tracker in communication with a server device according to one or more embodiments.

Referring now to FIG. 2, illustrated is an example visual tracker in communication with a server device according to one or more embodiments.

The system 200 can comprise a server device 202 and a visual tracker 100. The visual tracker 100 can comprise several subcomponents including, but not limited to: a camera component 102, an estimation component 104, a communication component 108, a neural network component 106, etc. The visual tracker can also comprise a processor 110 and a memory 112.

It should be noted that the sub-components, the processor 110, and the memory 112 can bi-directionally communicate with each other. Aspects of the processor 110 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. It should also be noted that in alternative embodiments other components including, but not limited to, the subcomponents, the processor 110, and/or the memory 112, can be external to the visual tracker.

Upon the visual tracker 100 receiving an indication that a living entity (e.g., animal, human, etc.) is within a range of the visual tracker, within a certain geographic location, and/or within the view of at least one camera, the visual tracker 100 camera component 102 can select a camera from a group of cameras to track a profile of the living entity. The camera can also be selected based on its field of view of the living entity and/or a field of view of a possible object that the living entity is viewing. For example if a shopper walks into a store, the camera component 102 can select the camera closest to the shopper that provides a clear line of sight to the shopper. The camera can acquire data associated with a position of the shopper's shoulders, a position of the shopper's head (e.g., pitch, yaw, etc.), a movement of the shopper's head, an orientation of the shopper's overall stance, etc.

Based on the data received by the camera, the estimation component 104 can estimate the shoppers gaze and/or pose without using facial recognition techniques. In essence, based on video data, the estimation component 104 can decipher how long a shopper has looked in a certain direction. The certain direction can correspond to a location (e.g., shelf, floor, display, etc.) indicating that the shopper has viewed a particular object at the location. The estimation component 104 can also leverage data from a neural network component 106. It should be noted that the neural network can be any type of neural network. For example, the neural network component 106 can leverage a convolutional neural network (CNN) to provide an analysis of the video data. The CNN can compare and contrast current poses and/or profiles of the shopper with previous posses and/or profiles of other shoppers. Certain probabilities can be ascertained based on how long previous shoppers have gazed at an object.

Data associated with previous and current shopper behavior can be stored locally at the visual tracker 100 and/or stored remotely at the server device 202. The communication component 108 can be configured to transmit data from the visual tracker 100 and receive data from the server device 202. Additionally, future predictions of customer behavior can stored locally at the visual tracker 100 and/or stored remotely at the server device 202. It should be noted that the server device can also be connected to other visual trackers (not shown) remote from the visual tracker 100. The other visual trackers can provide data to the server device 202 that can then be used for analysis at the visual tracker 100. For example, if a department store has several geographically remote locations, then data from one location may be relevant to an analysis of data at another location. Therefore, the server device 202 can be operable to provide historical data to/from the visual tracker 100 at both locations.

Figure 3:
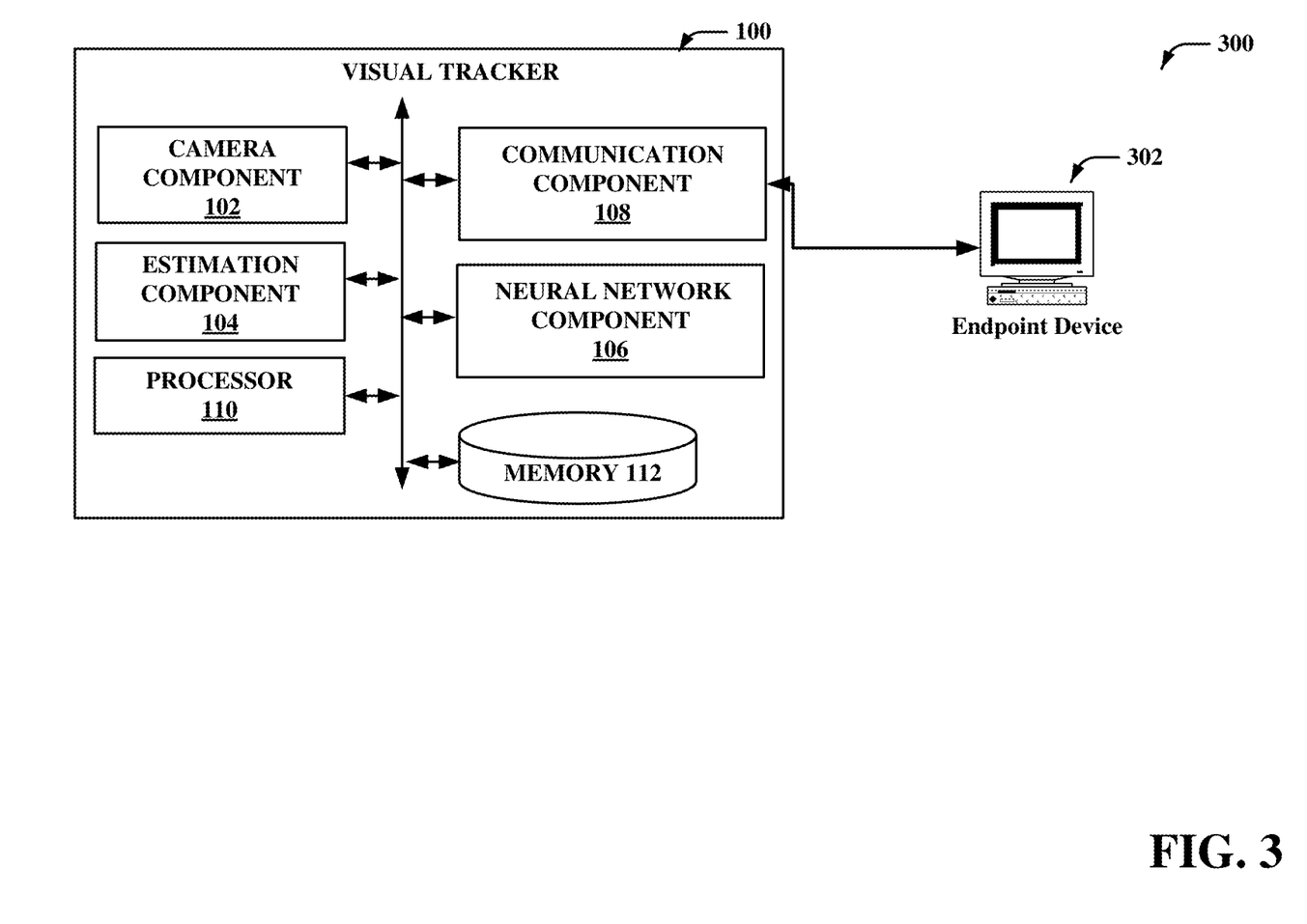
FIG. 3 illustrates an example visual tracker in communication with an endpoint device according to one or more embodiments.

Referring now to FIG. 3, illustrated is an example visual tracker in communication with an endpoint device according to one or more embodiments.

The system 300 can comprise an endpoint device 302 and a visual tracker 100. The visual tracker 100 can comprise several subcomponents including, but not limited to: a camera component 102, an estimation component 104, a communication component 108, a neural network component 106, etc. The visual tracker can also comprise a processor 110 and a memory 112.

It should be noted that the sub-components, the processor 110, and the memory 112 can bi-directionally communicate with each other. Aspects of the processor 110 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein. It should also be noted that in alternative embodiments other components including, but not limited to, the subcomponents, the processor 110, and/or the memory 112, can be external to the visual tracker.

Upon the visual tracker 100 receiving an indication that a living entity (e.g., animal, human, etc.) is within a range of the visual tracker, within a certain geographic location, and/or within the view of at least one camera, the visual tracker 100 camera component 102 can select a camera from a group of cameras to track a profile of the living entity. The camera can also be selected based on its field of view of the living entity and/or a field of view of a possible object that the living entity is viewing. For example if a shopper walks into a store, the camera component 102 can select the camera closest to the shopper that provides a clear line of sight to the shopper. The camera can acquire data associated with a position of the shopper's shoulders, a position of the shopper's head (e.g., pitch, yaw, etc.), a movement of the shopper's head, an orientation of the shopper's overall stance, etc.

Based on the data received by the camera, the estimation component 104 can estimate the shoppers gaze and/or pose without using facial recognition techniques. In essence, based on video data, the estimation component 104 can decipher how long a shopper has looked in a certain direction. The certain direction can correspond to a location (e.g., shelf, floor, display, etc.) thus indicating that the shopper has viewed a particular object at the location. The estimation component 104 can also leverage data from a neural network component 106. It should be noted that the neural network can be any type of neural network. For example, the neural network component 106 can leverage a convolutional neural network (CNN) to provide an analysis of the video data. The CNN can compare and contrast current poses and/or profiles of the shopper with previous posses and/or profiles of other shoppers. Certain probabilities can be ascertained based on how long previous shoppers have gazed at an object. For example, one statistic that can be generated via the visual tracker is that 60% of shoppers that do not gaze at a certain object for more than five seconds are not prone to purchase that object. Therefore, a store can more accurately predict a shoppers behavior based on the shoppers visual profile.

Data associated with previous and current shopper behavior can be assessed and/or manipulated at the endpoint device 302. The communication component 108 can be configured to transmit data from the visual tracker 100 and receive data from the endpoint device 302. A user can provide additional data and/or insights into the system 300 via the endpoint device 302. For example, the endpoint device 302 can be used to define specific store locations as high traffic areas, low traffic areas, and/or moderate traffic areas based on previous and/or anticipated shopper statistics associated with shoppers gazes. This information can be used for strategic placement of items within store locations.

Figure 4:
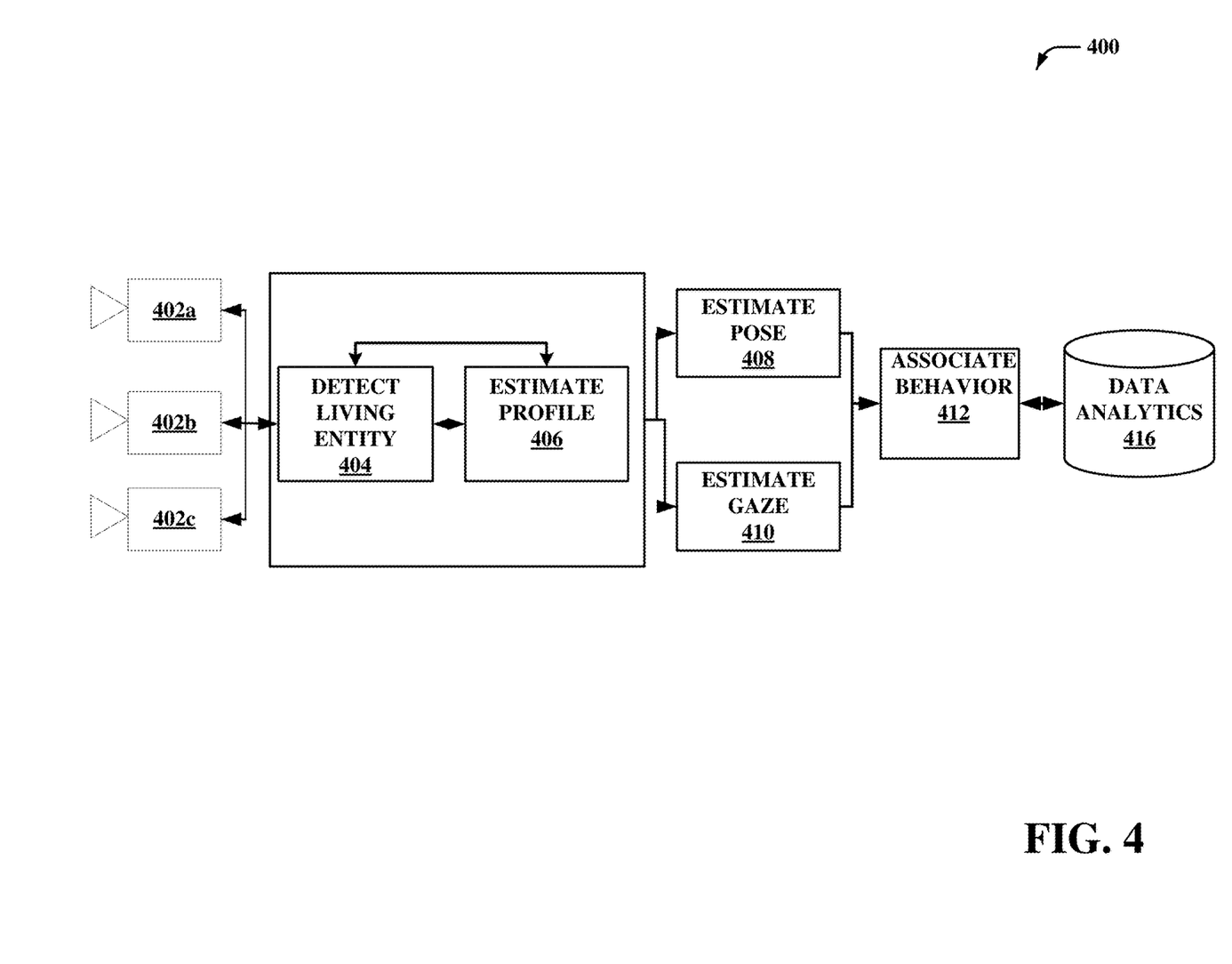
FIG. 4 illustrates an example system to track a profile of a living entity according to one or more embodiments.

Referring now to FIG. 4, illustrated is an example system to track a profile of a living entity according to one or more embodiments. The system 400 can detect a living entity at element 404 via one or more cameras $402_a$, $402_b$, $402_c$ and/or any other detection means (e.g., motion sensors, etc.). Based on the detection of the living entity, one or more cameras $402_a$, $402_b$, $402_c$ can be selected to generate visual data associated with a visual profile of the living entity. The visual data can then be used to estimate a visual profile of the living entity at element 406. The profile can comprise data representative of a stance (e.g., orientation, body parts, head pitch, head yaw, etc.) of the living entity. The visual profile data can then be filtered based on an estimation of a pose at element 408 and/or an estimation of a gaze at element 410. The filtered profile data can then be used to determine a behavior associated with the living entity at element 412, prior to being sent to a data analytics engine 416 for additional data that can be provided via the neural network component 106.

Figure 5:
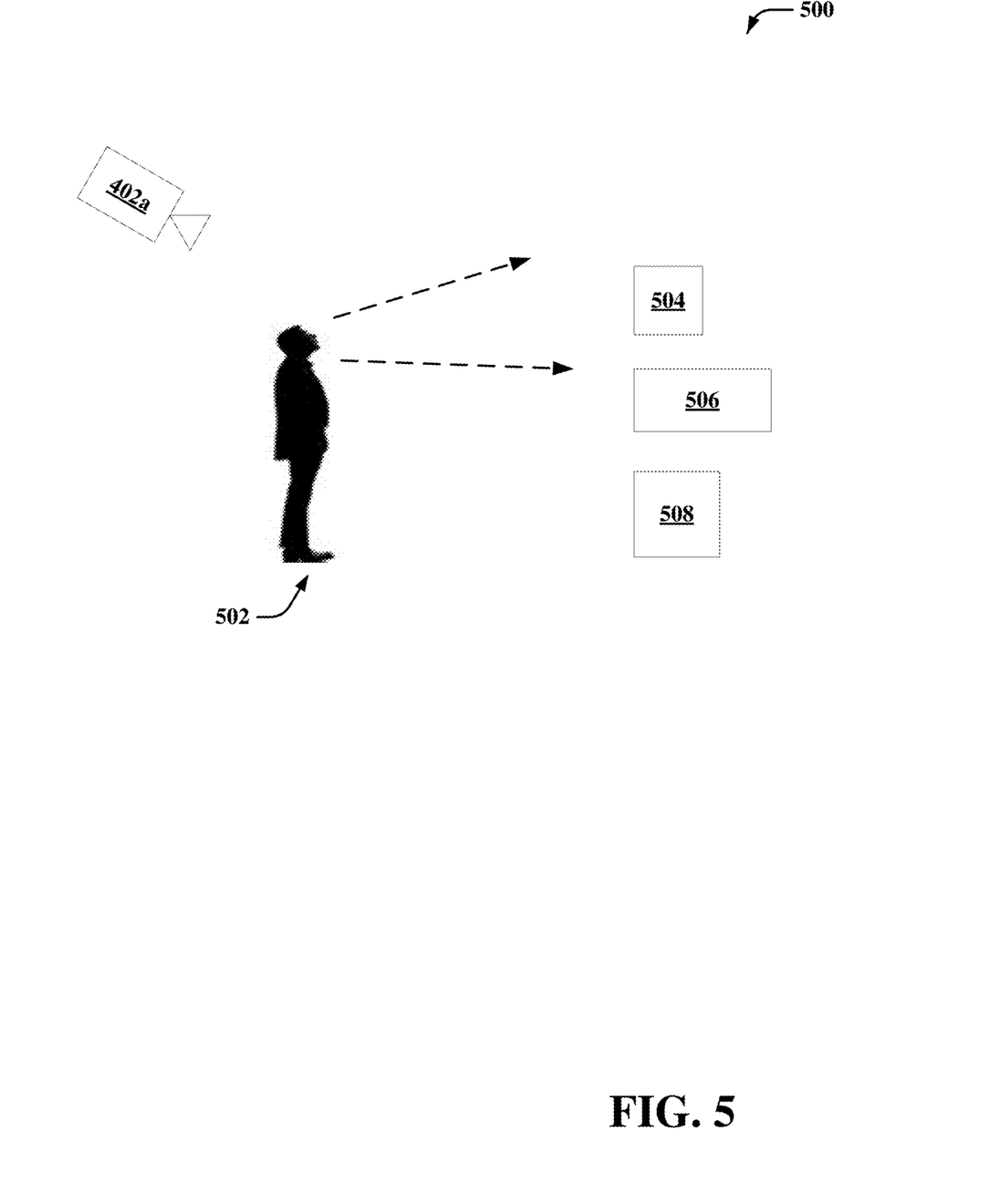
FIG. 5 illustrates an example schematic system block diagram of a living entity gazing at an object according to one or more embodiments.

Referring now to FIG. 5, illustrated is an example schematic system block diagram of a living entity gazing at an object according to one or more embodiments. FIG. 5 depicts a system 500 comprising a living entity 502, wherein several objects 505, 506, 508 can be in the field of view of the living entity 502. However, based upon a pitch and/or yaw of the living entity's 502 head, the visual tracker 100 can estimate that the living entity 502 is viewing the object 504. Additionally, a length of time the living entity 502 is viewing the object 504 can be used to determine a likelihood that the living entity 502 will purchase the object 504 based on additional data provide from a convolutional neural network. Additionally, other video cameras at or near a checkout register can confirm whether the living entity 502 has actually purchased the object 504. The living entity's 502 purchase data associated with an actual purchase can then be associated with his/her viewing and/or gazing data previously collected while viewing the object 504.

Figure 6:
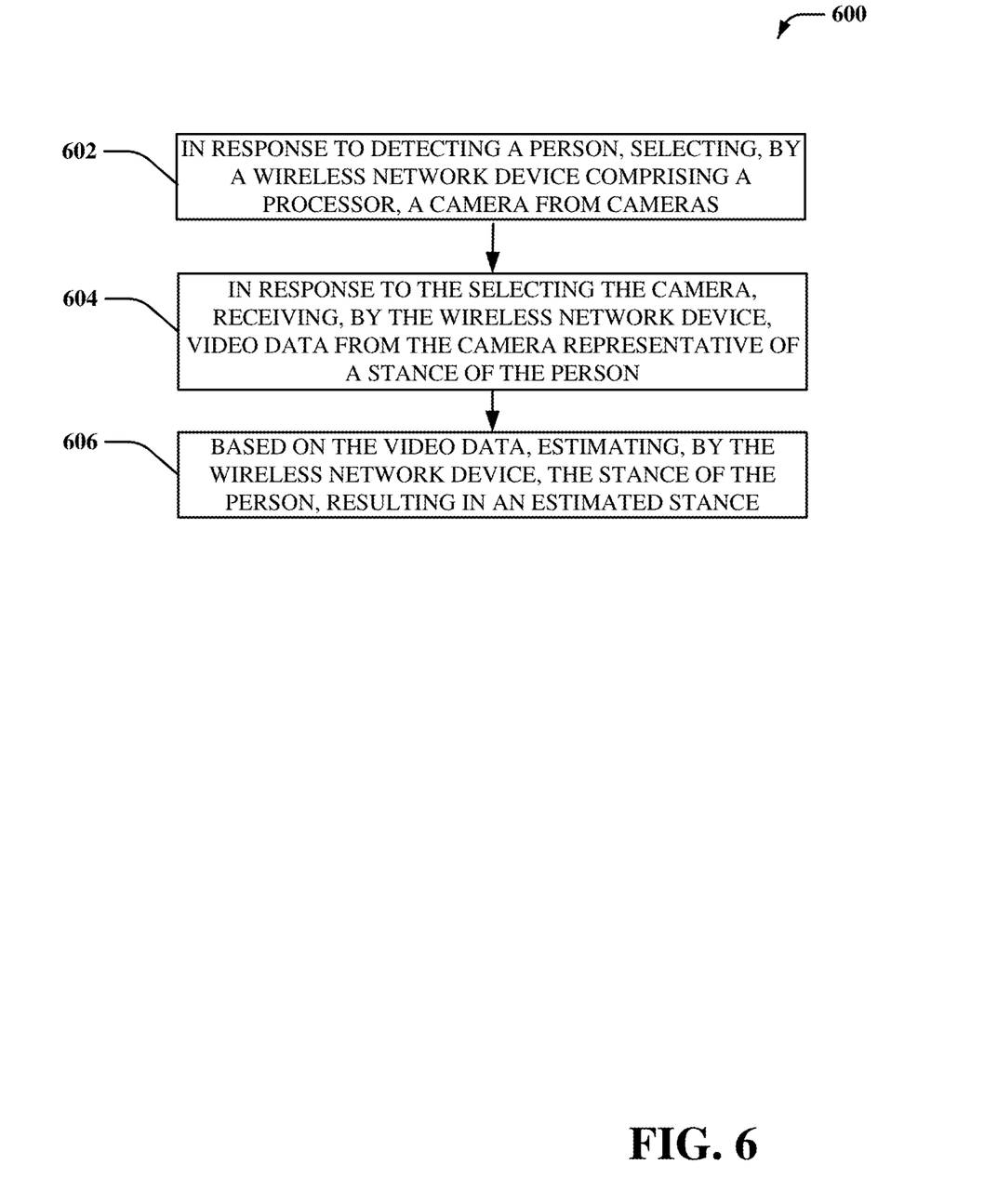
FIG. 6 illustrates an example schematic system block diagram of a method for visual tracking according to one or more embodiments.

Referring now to FIG. 6, illustrated is an example schematic system block diagram of a method for visual according to one or more embodiments. At element 602, in response to detecting a person (e.g., via the camera component 102) the method 600 can comprise selecting (e.g., via the camera component 102), by a wireless network device comprising a processor, a camera from cameras $402_a$, $402_b$, $402_c$. The selecting can be based on a video quality associated with the quality of the video from the camera. At element 604, in response to the selecting the camera, the method can comprise receiving, by the wireless network device, video data from the camera representative of a stance of the person (e.g., living entity 502). Additionally, based on the video data, the method can comprise estimating (e.g., via the estimation component 104), by the wireless network device, the stance of the person (e.g., living entity 502), resulting in an estimated stance at element 606.

Figure 7:
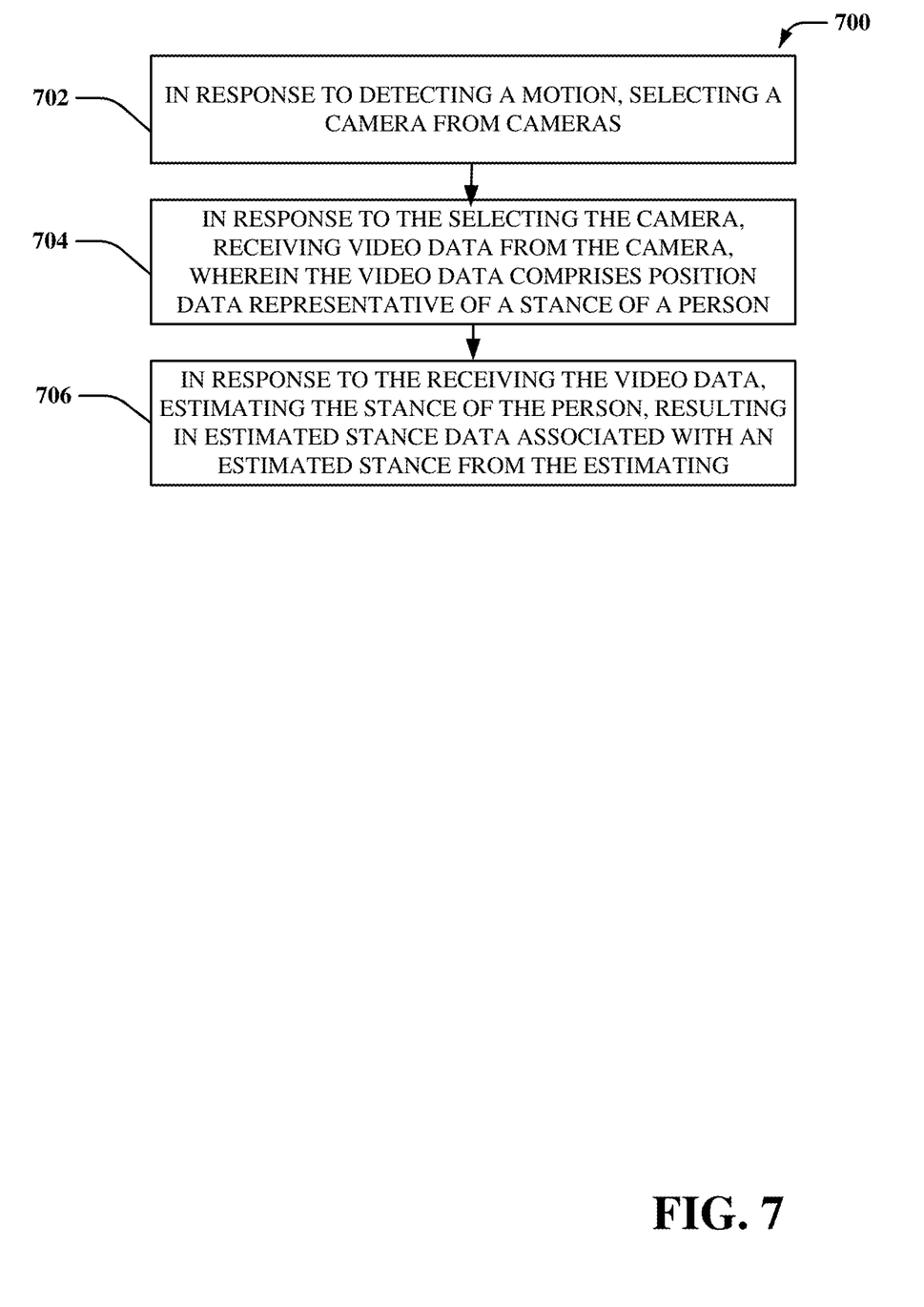
FIG. 7 illustrates an example schematic system block diagram for a system for visual tracking according to one or more embodiments.

Referring now to FIG. 7, illustrated is an example schematic system block diagram for a system for visual tracking according to one or more embodiments. At element 702, in response to detecting a motion (e.g., via the camera component 102), the system 700 can comprise selecting (e.g., via the camera component 102) a camera from cameras $402_a$, $402_b$, $402_c$. At element 704, in response to the selecting the camera, the system can comprise receiving video data from the camera, wherein the video data comprises position data representative of a stance of a person (e.g., living entity 502). Furthermore, in response to the receiving the video data, the system 700 can estimate the stance of the person (e.g., via the estimation component 104), resulting in estimated stance data associated with an estimated stance from the estimating.

Figure 8:
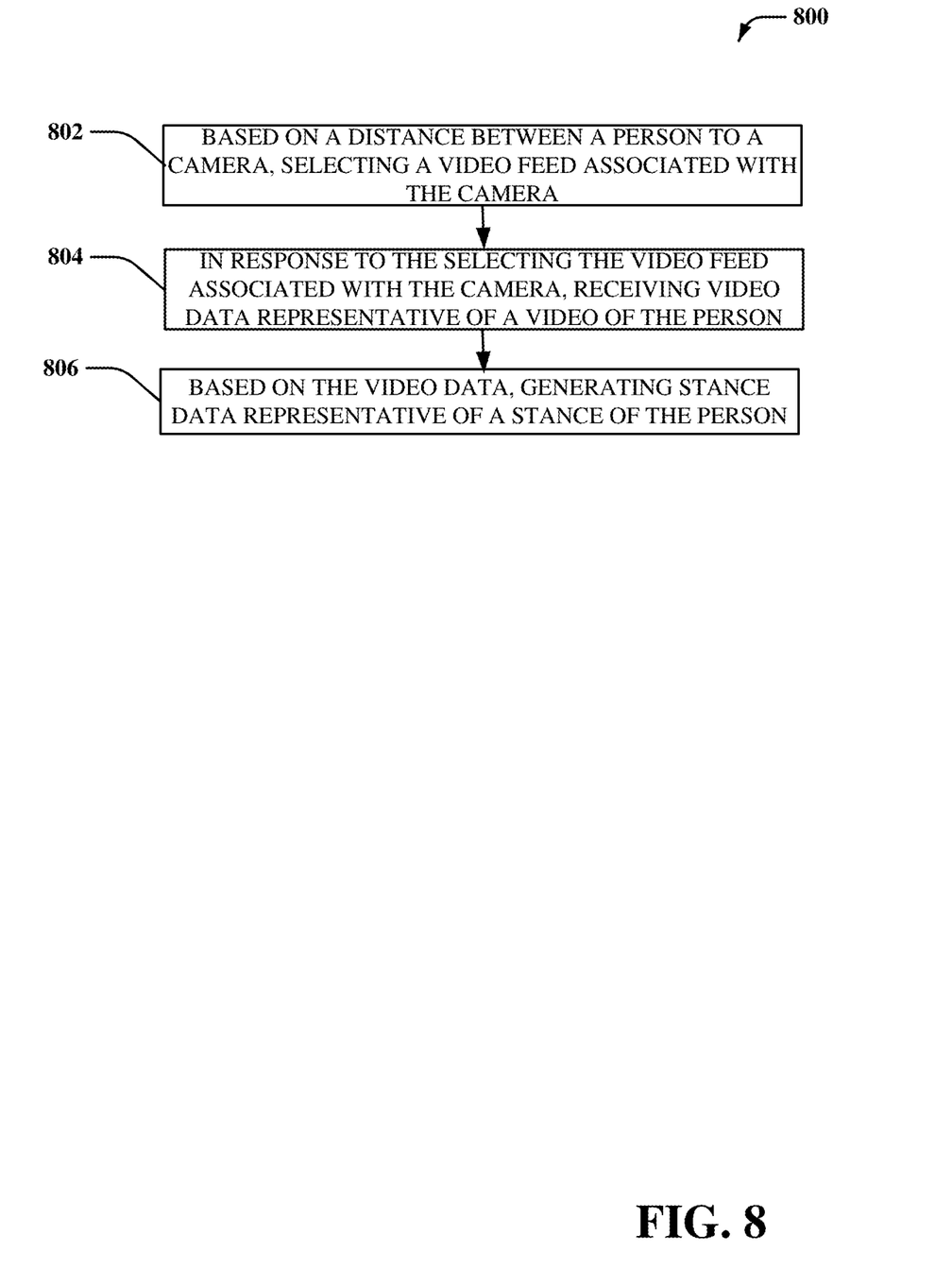
FIG. 8 illustrates an example schematic system block diagram for a computer readable medium for visual tracking according to one or more embodiments.

Referring now to FIG. 8, illustrated is an example schematic system block diagram for a computer-readable medium for visual tracking according to one or more embodiments. Based on a distance between a person (e.g., living entity 502) to a camera $402_a$, $402_b$, $402_c$, the computer-readable medium can select (e.g., via the camera component 102) a video feed associated with the camera at system 800. In response to selecting the video feed associated with the camera, the computer-readable medium can receive video data representative of a video of the person (e.g., living entity 502), and based on the video data, the computer-readable medium can generate stance data (e.g., estimation of a pose 408) representative of a stance of the person (e.g., living entity 502).

Figure 9:
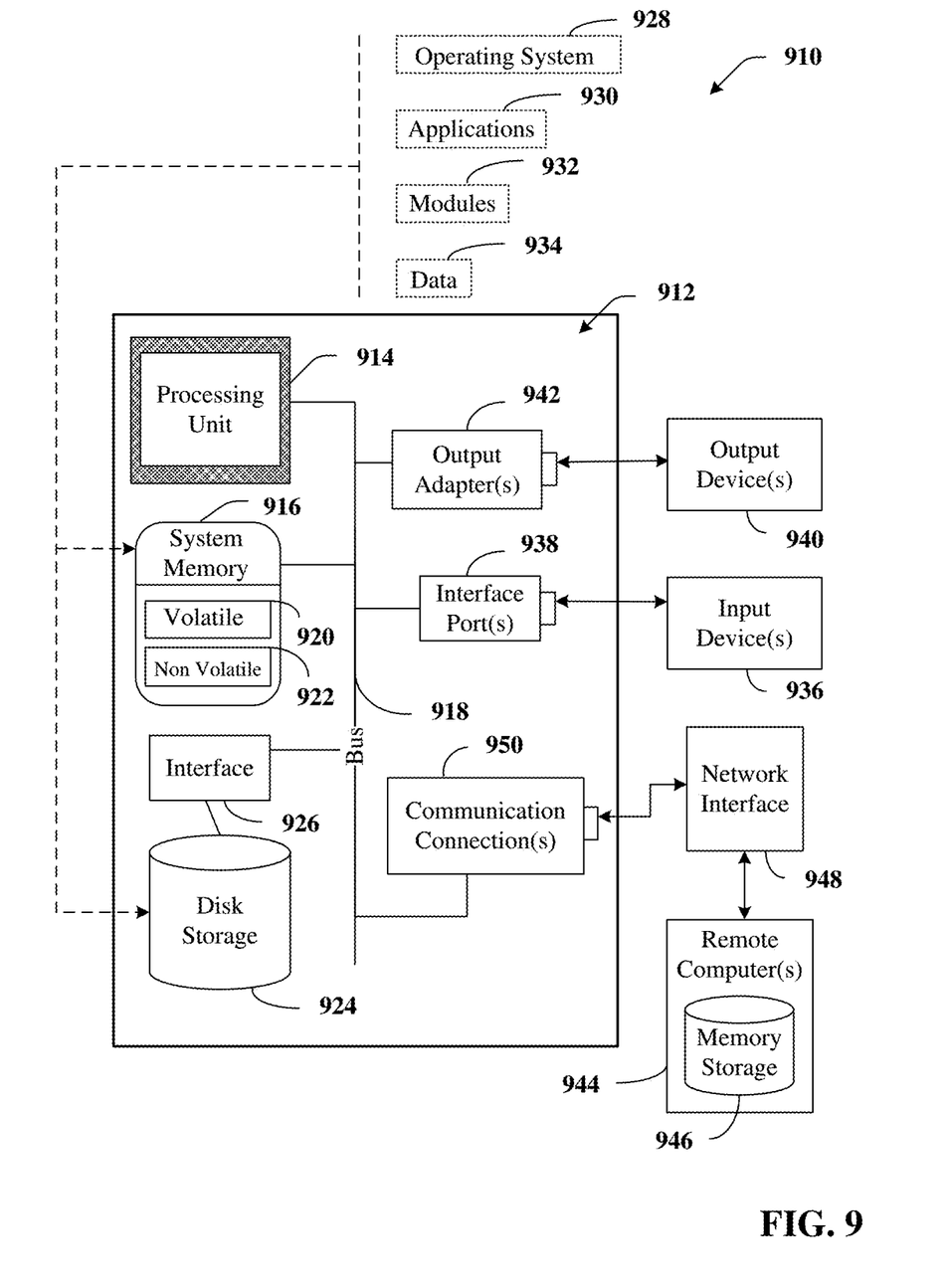
FIG. 9 is an example computing environment.
Figure 10:
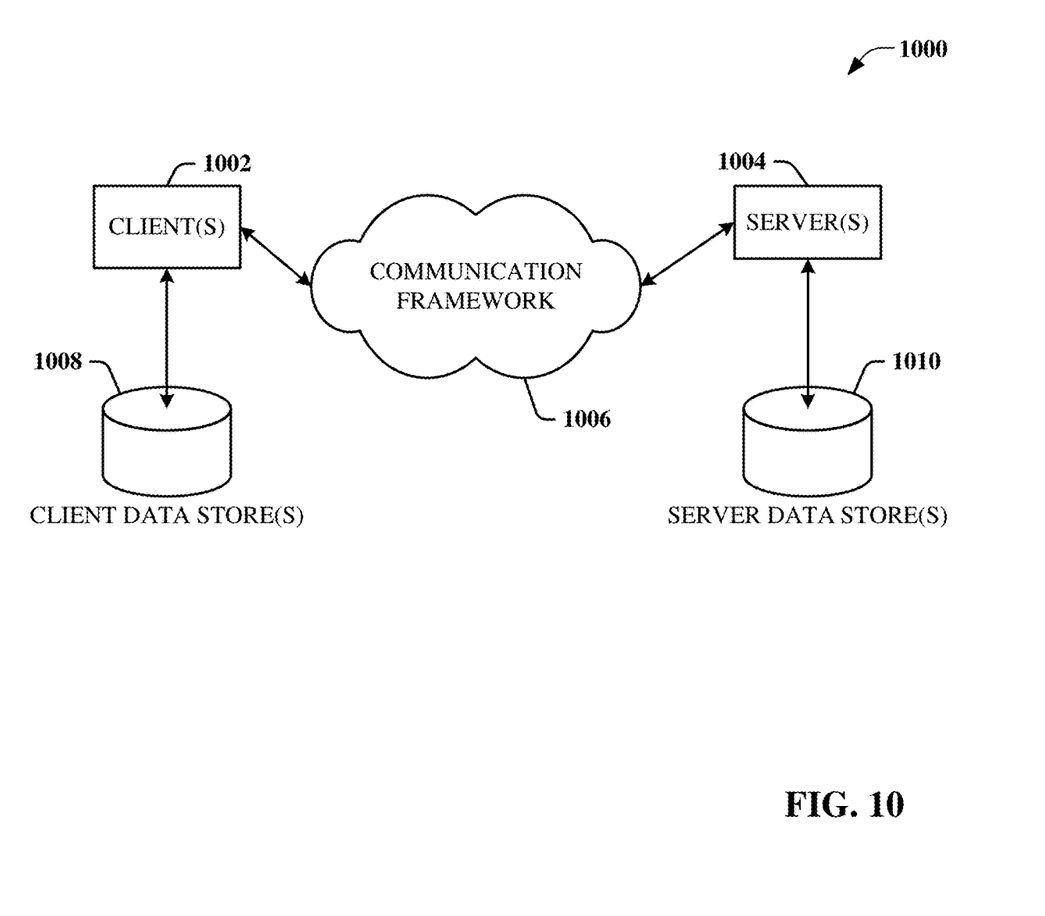
FIG. 10 is an example networking environment.

In order to provide a context for the various aspects of the disclosed subject matter, FIGS. 9 and 10 as well as the following discussion are intended to provide a brief, general description of a suitable environment in which the various aspects of the disclosed subject matter may be implemented.

With reference to FIG. 9, an example environment 910 for implementing various aspects of the aforementioned subject matter includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Multi-core microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable PROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer 912. System applications 930 take advantage of the management of resources by operating system 928 through program modules 932 and program data 934 stored either in system memory 916 or on disk storage 924. It is to be appreciated that one or more embodiments of the subject disclosure can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapters 942 are provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the system bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A method, comprising:
   in response to detecting a person, selecting, by a wireless network device comprising a processor, a camera from cameras;
   in response to the selecting the camera, receiving, by the wireless network device, video data from the camera representative of a stance of the person;
   based on the video data, estimating, by the wireless network device, the stance of the person, resulting in an estimated stance; and
   in response to the selecting of the camera, utilizing, by the wireless network device, a convolutional neural network to perform the estimating of the estimated stance.

2. The method of claim 1, wherein the stance of the person comprises an orientation of a head of the person to in relation to an object.

3. The method of claim 1, wherein the stance of the person comprises an orientation of a shoulder of the person in relation to an object.

4. The method of claim 1, wherein the selecting the camera is based on a distance of the camera to the person.

5. The method of claim 1, wherein the selecting the camera is based on a video quality associated with the camera.

6. The method of claim 1, wherein the selecting the camera is based on a visibility of a face of the person by the camera.

7. The method of claim 1, wherein the estimated stance is a first estimated stance, and further comprising:
   determining, by the wireless network device, a second estimated stance that is different than the first estimated stance.

8. A system, comprising:
   a processor; and
   a memory that stores executable instructions that, when executed by the processor, facilitate performance of operations, comprising:
     in response to detecting a motion, selecting a camera from cameras;
     in response to the selecting the camera, receiving video data from the camera, wherein the video data comprises position data representative of a stance of a person; and
     in further response to the selecting of the camera and the receiving of the video data, utilizing a convolutional neural network to estimate the stance of the person, resulting in estimated stance data associated with an estimated stance from the estimating.

9. The system of claim 8, wherein the estimating the stance of the person comprises estimating a yaw of a head of the person.

10. The system of claim 8, wherein the estimating the stance of the person comprises estimating a pitch of a head of the person.

11. The system of claim 8, wherein the motion is a first motion, wherein the estimated stance is a first estimated stance, and wherein the operations further comprise:
    based on detecting a second motion and in response to utilizing neural network data to determine the first estimated stance, utilizing the neural network data to determine a second estimated stance in relation to an object.

12. The system of claim 11, wherein the neural network data is convolutional neural network data.

13. The system of claim 8, wherein the operations further comprise:
    sending the estimated stance data to a server device for an analysis utilized to determine a predicted behavior of the person.

14. The system of claim 8, wherein the estimated stance data is first estimated stance data, and wherein the operations further comprise:
    utilizing the first estimated stance data as an input to the convolutional neural network to determine a second estimated stance data.

15. A non-transitory computer-readable storage medium, comprising executable instructions that, when executed by a processor, facilitate performance of operations, comprising:
- based on a distance between a person to a camera, selecting a video feed associated with the camera;
- in response to the selecting the video feed associated with the camera, receiving video data representative of a video of the person;
- based on the video data, generating stance data representative of a stance of the person; and
- in response to the selecting of the video feed, utilizing a convolutional neural network to estimate the stance of the person.

16. The non-transitory computer-readable storage medium of claim 15, wherein the operations further comprise:
- transmitting the stance data to a remote device to generate a prediction associated with a behavior of the person.

17. The non-transitory computer-readable storage medium of claim 15, wherein the operations further comprise:
- based on the stance data, determining an object that the person is viewing.

18. The non-transitory computer-readable storage medium of claim 17, wherein the operations further comprise:
- based on the stance data, determining a time that the person is viewing the object.

19. The non-transitory computer-readable storage medium of claim 17, wherein the operations further comprise:
- in response to the generating the stance data, associating a location of the object with the stance data.

20. The non-transitory computer-readable storage medium of claim 17, wherein the distance is a first distance, and wherein the operations further comprise:
- in response to the generating the stance data, generating distance data representative of a second distance between the object and the person.

* * * * *